Patented Sept. 18, 1923.

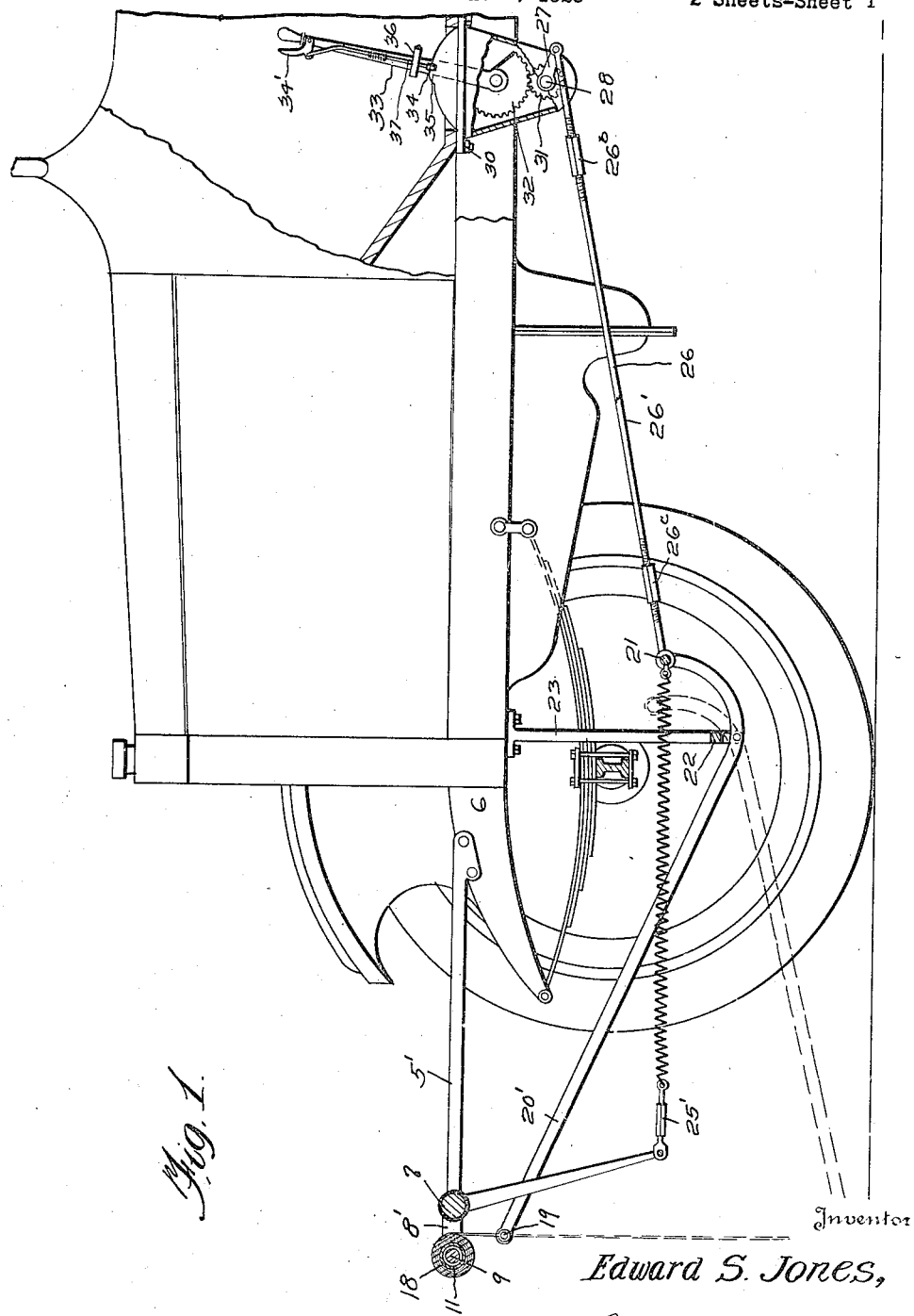

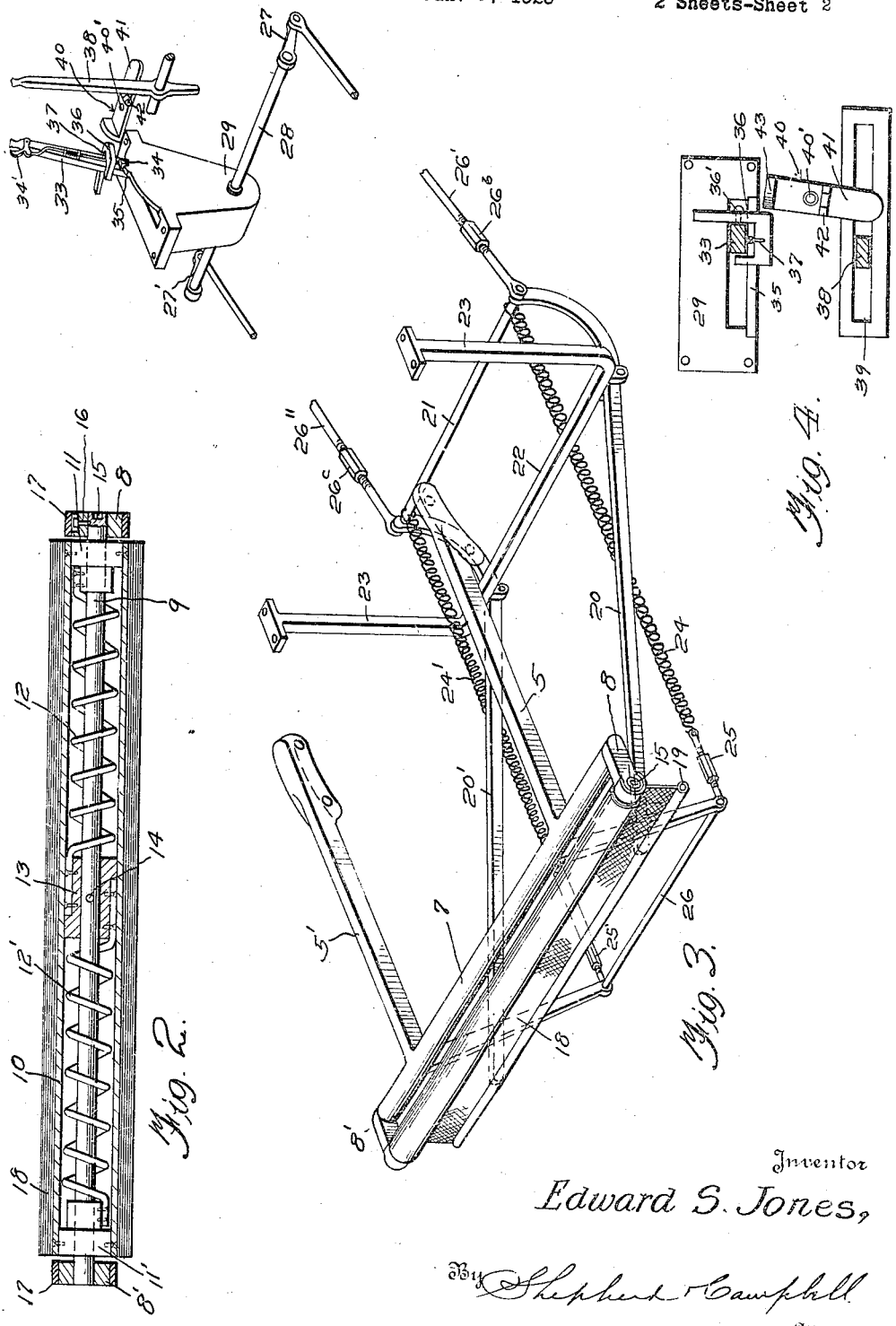

1,468,112

UNITED STATES PATENT OFFICE.

EDWARD S. JONES, OF MOBILE, ALABAMA.

AUTOMATIC LIFE-SAVING FENDER FOR AUTOMOBILES.

Application filed January 9, 1923. Serial No. 611,588.

*To all whom it may concern:*

Be it known that I, EDWARD S. JONES, a citizen of the United States of America, residing at Mobile, in the county of Mobile and State of Alabama, have invented certain new and useful Improvements in Automatic Life-Saving Fenders for Automobiles, of which the following is a specification, reference being had therein to the accompanying drawings.

This invention relates to an automatic life saving fender for automobiles. Twelve thousand five hundred persons were killed and approximately three hundred and fifty thousand were injured in automobile accidents in 1921. The rapid increase in the number of motor cars with the resulting increase in congestion renders it highly important to provide a safe and reliable fender which will prevent persons from passing under the wheels of motor vehicles or from coming into contact with any of the metal parts of such vehicles with such force as to kill or seriously injure them. The present invention has been designed with the foregoing objects in view.

U. S. Letters Patent No. 1,398,434, were issued to me on November 29, 1921, for a fender of the general character of that herein shown and described. The present invention retains all of the advantages of the fender covered by the aforesaid patent and presents certain additional refinements and advantages thereover in that, according to the present invention the fender structure is supported from and moves with the chassis so that there is no relative movement between chassis carried parts and axle carried parts in the normal movement of the vehicle.

A further advantage of the present construction is that it is adapted to be applied to a wide range of makes of cars and is so constructed as to clear the depending crank case of many of the automobiles now in use. Further the device of the present invention is very easy to release or to restore to normal position after having been operated.

Further objects and advantages of the invention will be more specifically recited in connection with the detailed description of parts which follows:

In the accompanying drawings:

Fig. 1 is a longitudinal sectional view through the forward part of an automobile having the fender applied thereto;

Fig. 2 is a longitudinal sectional view through the spring actuated roller hereinafter described;

Fig. 3 is a perspective view of the apparatus of the present invention showing the same dissociated from the auto; and Fig. 4 is a view partly in plan and partly in horizontal section of the relief mechanism hereinafter described.

The device of the present invention comprises side bars 5, 5' adapted to be bolted or otherwise secured to the side frame members 6 of the chassis of the automobile. At their front ends the bars 5, 5' are shaped to conform to the periphery of a fixed cylinder 7. End pieces 8, 8' project forwardly from the opposite end of the fixed cylinder 7 and constitute a support for a shaft or mandrel 9 and which shaft or mandrel, in turn, constitutes a bearing for a spring actuated roller or cylinder 10. The cylinder 10, see Fig. 2, is secured at its opposite ends by screws or other fastening devices to collars 11, 11', said collars being mounted for rotation on the shaft 9. Right and left hand springs 12, 12' have their outer ends fixed to the collars and their inner ends fixed to a core block or drum 13 which is immovable with respect to the mandrel 9. This part 13 may be a separate piece secured by a pin or screw 14 to the mandrel or it may be made in one piece with said mandrel. The springs are made of the best spring steel and their ends are enlarged sufficiently to permit of the desired number of the screw holes by which they may be secured to the core and collars, respectively. The core 13 is, preferably, recessed so that the outer faces of the enlarged ends of the springs lie flush with the outer surface of said core and, if desired, I may make this recessed portion of dove-tail formation and correspondingly shape the ends of the springs, in which case the springs could be secured to the core without the necessity of drilling screw holes therethrough.

To provide means for adjusting the tension of the springs 12, 12', I contemplate mounting the mandrel so that it may be turned with respect to the collars 11, 11'. Many ways may be devised for accomplishing this result. As one such way I propose to form in the end of the mandrel 9 an angular opening 15 in which a suitably shaped tool may be inserted for turning the mandrel. After the mandrel has been turned to the desired extent, a set screw 16 which projects through the end piece 8 may be tightened to hold said mandrel in adjusted position. I preferably cover the end pieces 8, 8' with rubber casings or shoes 17 to provide a cushion to these parts.

The fender proper consists of a flexible curtain or web 18 which is, preferably, of rubber, though I may employ other flexible sheet material in lieu of rubber. This curtain is wound upon the roller 10 and at its free edge carries a rod 19 to which the forward ends of swinging arms or levers 20, 20' are pivotally connected. These arms have upwardly curved rear ends which are connected by a cross-bar 21 and adjacent said cross-bar these arms are pivoted upon a transverse rod 22 which is supported by hangers 23, said hangers, in turn, being connected to the chassis of the automobile. Springs 24, 24' are connected at their rear ends to the transverse rod 21 and include turnbuckles 25, 25' in their length by which their tension may be adjusted. The forward ends of these springs are connected to a transverse rod 26 constituting a part of a hanger of general U shape which projects downwardly and rearwardly from, and is carried by the fixed cylinder 7. The transverse cross-bar or rod 21 is connected by links or cables 26', 26'' with cranks 27, 27' located upon the opposite ends of a shaft 28. This shaft is journaled in a housing 29 which is bolted at 30 to the underside of the floor of the automobile and within this housing the shaft 28 carries a pinion 31 which meshes with a segmental gear 32 to which partial rotation may be imparted by the swinging movement of a lever 33. The links or cables 26', 26'' include turnbuckles 26$^b$, 26$^c$ in their length so that they may be maintained under proper tension and adjustment of the parts may be effected.

It is manifest that if the lever 33 be drawn rearwardly and held latched in such rearward position, movement of the lever will impart partial rotation to shaft 28 to move the cranks 27 to the position shown. This will, in turn, draw upon the links or cables 26', 26'' and place the springs 24, 24' under tension. Furthermore, it will move the outer ends of the arms 20, 20' upwardly so that the right and left hand springs may wind the curtain or web upon the roller 10.

Furthermore, it will be apparent that if the lever 33 be released the springs 24, 24', which are stronger than the right and left hand springs in the cylinder 10, will act to throw the arms 20, 20' downwardly and draw the web from roller 10 and dispose it across the front of the automobile in such position that a person in the path of the automobile will be engaged by said flexible and yieldable web and will be pushed to a position of safety without serious injury and without the possibility that such person will pass beneath the wheels of the vehicle.

The invention provides means whereby the release of the lever 33 and consequently the release of the fender and its movement to operative position may be brought about by hand operation, foot operation or automatically by the operation of the emergency brake lever of the automobile. The means for holding the lever 33 in its restricted position comprises a latch 34 which engages with a ratchet tooth 35 in a manner common in automobile construction and also well known in agricultural implements. By grasping the upper part of the lever 33 and gripping the handle 34', the latch 34 is lifted and then the lever 33 may move forwardly. I also pivot to the lever 33 in a substantially horizontal position a trip piece 36 the pivot point being at 36'. By pressing upon the outer end of 36 the inner end is lifted. A pin 37 carried by the latch 34 overlies this trip piece so that when its inner end is lifted the latch is lifted and the lever 33 is released. Thus means are provided for effecting the release of lever 33 by the foot. 38 designates the usual emergency brake lever of the automobile which operates in a slot 39 formed in the floor of the automobile. I pivot to the floor of the automobile at 40' a lever 40 having an end 41 hinged thereto at 42. If this hinged end be folded back upon its hinge out of the path of movement of the emergency brake lever the operation of the emergency brake lever, as in parking the car, etc., has no effect upon the lever 33. But if this hinged end be thrown down to a position where it lies in the path of movement of the lever 38 then rearward movement of said lever 33 will rock the bar 40 upon its pivot 40' to cause a hump 43 upon the other end of said bar to ride beneath the end of the trip 36 and lift it to, in turn, release the latch 34 and thus automatically release the lever 33 when the emergency brake lever is operated.

It is to be understood that the drawings are merely illustrative of the principles involved. Many specific mechanical arrangements may be worked out to carry out these principles. It is, therefore, to be understood that the invention is not limited to the precise construction set forth but that it includes within its purview whatever changes fairly come within either the terms or the spirit of the appended claims.

Having described my invention, what I claim is:

1. The combination with a vehicle, of a fender comprising a flexible web extending across the front of said vehicle, a roller upon which said web may be wound, spring means for actuating said roller, an emergency brake lever and means under control of the emergency brake lever for actuating said web against the action of the spring roller and means for securing said roller to the chassis of the automobile.

2. The combination with a vehicle, of a fender comprising a flexible web extending across the front of said vehicle, a roller upon which said web may be wound, spring means for actuating said roller, swinging arms engaged with the lower edge of said web, spring means tending to force said arms downwardly, a lever controllable from the driver's seat, connections between said lever and the swinging arms for lifting said swinging arms, a spring detent for said lever, an emergency brake lever, means operable upon movement of the emergency brake lever to brake setting position for releasing said detent and means for supporting said roller and the associated mechanism wholly from the chassis of the automobile and independently of the axle thereof.

3. The combination with the side frame members of the chassis of an automobile, of supports engaged therewith and projecting forwardly therefrom, a spring actuated roller mounted in said supports, a flexible web wound upon said roller, spring actuated means tending to draw said web downwardly against the action of said spring actuated roller, an actuating element controllable from the driver's seat for placing the last named spring means under tension and spaced connections leading from the actuating means to the spring actuated means and adapted to lie upon opposite sides of the crank case of the automobile.

4. The combination with forwardly projecting elements adapted to be secured to the side members of the chassis of an automobile, a spring actuated roller supported therefrom, a depending bracket supported therefrom, a fulcrum element secured to the chassis of the automobile, arms pivoted upon said fulcrum element, a curtain to the lower end of which the free ends of said arms are connected, said curtain being wound upon the spring actuated roller, a cross-bar connecting said arms, spring means extending between said cross bar and said bracket, a movable lever accessible from the driver's seat of an automobile and connections between said movable lever and said cross bar.

5. In combination a housing adapted to be secured to the underside of the floor of an automobile, a segmental gear in said housing, a handle connected to the segmental gear and projecting upwardly through the floor of the automobile, a pinion with which said segmental gear meshes, a shaft by which said pinion is carried, cranks upon the outer ends of said shaft, swinging levers connected by a cross bar, connections between said cranks and said cross bar, spring means extending between said cross bar and a fixed support, a curtain to the lower edge of which said swinging arms are connected, a spring actuated roller upon which said curtain is wound and substantially horizontal supports projecting forwardly from the side frame members of the chassis of an automobile and from which said roller is supported.

6. The combination with rigid members projecting forwardly from the side frame members of the chassis of an automobile, a fixed cylinder, end pieces connected to the said cylinder, a mandrel supported in said end pieces, a roller mounted to turn with respect to said mandrel, right and left hand springs carried by said mandrel, a core piece secured to said mandrel, said springs being secured at one end to the core piece, collars to which the other ends of said springs are secured, said collars being secured to said roller, an elastic curtain wound upon the roller and means controllable from the driver's seat of an automobile for drawing said curtain downwardly against the tension of the right and left hand springs.

7. A device of the character described comprising a web, a spring actuated roller tending to wind said web thereon, spring means strong enough to overcome the action of the spring actuated roller and tending to withdraw the web therefrom, an operating lever for placing the last named spring means under tension, a latch for holding the last named lever in retracted position and a member movable to and from operative position with respect to an emergency brake lever of an automobile and adapted when actuated to release said latch.

8. A structure as recited in claim 7 in combination with means for releasing said latch manually either by the hand or by the foot.

9. A device of the character described comprising a spring actuated fender mechanism, a lever for holding it in elevated position, an emergency brake lever adjacent the first named lever, a latch for holding the first named lever in retracted position and a pivoted element comprising a hinged end movable to and from operative position with respect to the emergency brake lever and operative when disposed in the path of movement of said emergency brake lever to actuate said latch to release the first named lever when the emergency brake lever is actuated.

In testimony whereof I hereunto affix my signature.

EDWARD S. JONES.